United States Patent [19]
Read

[11] Patent Number: 6,136,076
[45] Date of Patent: Oct. 24, 2000

[54] AIR/OIL SEPARATOR WITH MOLDED TOP SEALING FLANGE

[75] Inventor: Brain Read, Stow, Ohio

[73] Assignee: Air-Maze Corporation, Stow, Ohio

[21] Appl. No.: 09/174,137

[22] Filed: Oct. 16, 1998

[51] Int. Cl.[7] .................................................. B01D 29/00
[52] U.S. Cl. ................................ 96/189; 55/480; 55/502; 55/503; 55/508; 55/510; 55/521
[58] Field of Search ..................... 96/188, 189; 55/480, 55/502, 503, 507, 508, 509, 510, 521; 210/451, 453

[56] References Cited

U.S. PATENT DOCUMENTS

| | | | |
|---|---|---|---|
| 2,068,858 | 1/1937 | Jones | 55/503 |
| 4,349,363 | 9/1982 | Patel et al. | |
| 4,634,527 | 1/1987 | Marshall | |
| 4,765,811 | 8/1988 | Beckon | |
| 5,178,760 | 1/1993 | Solberg, Jr. | 55/503 |
| 5,207,811 | 5/1993 | Buonpastore | |
| 5,246,581 | 9/1993 | Goldman | 210/453 |
| 5,605,555 | 2/1997 | Patel et al. | 55/502 |
| 5,669,949 | 9/1997 | Dudrey et al. | |
| 5,985,004 | 11/1999 | Boyd | 95/241 |

*Primary Examiner*—David A. Simmons
*Assistant Examiner*—Robert A. Hopkins
*Attorney, Agent, or Firm*—Rankin, Hill, Porter & Clark LLP

[57] ABSTRACT

In an oil reservoir tank having a tank body and a tank cover, an air/oil separator includes a filter media pack, arranged radially symmetrically about an axis, a bottom end cap secured to one end of the filter media pack, and a top end cap and flange member. The top end cap and flange member is made of a moldable material and has a top end cap portion and a flange portion. The other end of the filter media pack is embedded in top end cap portion. The flange portion extends radially outwardly from the axis for mounting the separator between the tank body and the tank cover. The top end cap and flange member is formed of a sealing material. The top end cap and flange member is a single unitary member forming both flange and the end cap, which eliminates separate flange and trough members which must be welded or brazed together. In addition the flange portion of the top end cap and flange member eliminates the need for additional separate sealing members, such as O-rings.

14 Claims, 2 Drawing Sheets

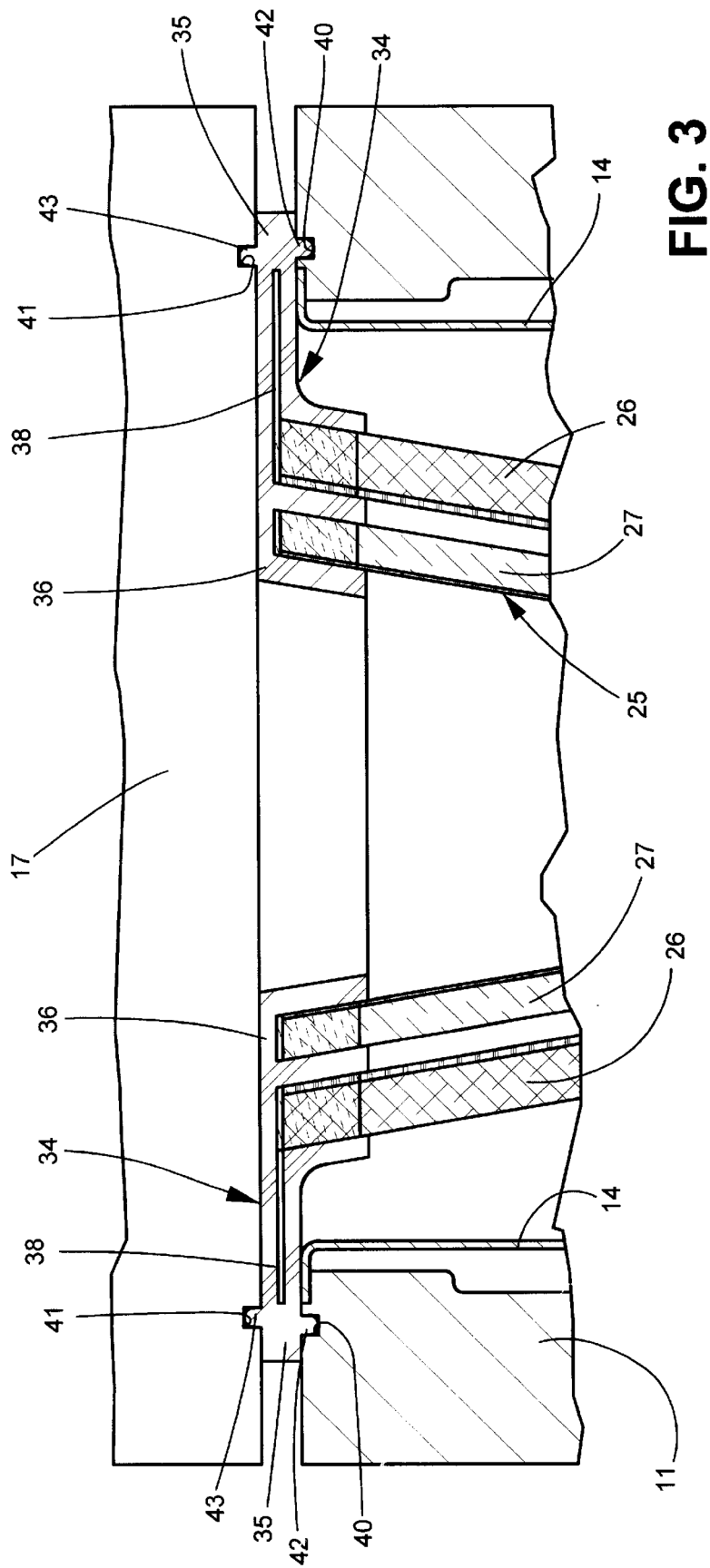

AIR/OIL SEPARATOR WITH MOLDED TOP SEALING FLANGE

BACKGROUND OF THE INVENTION

1. Field of the Invention

This invention relates to air/oil separators, and more particularly to the construction of the radially outwardly extending mounting flange on such separators.

2. Description of the Prior Art

Air/oil separators are typically used where it is necessary to remove suspended oil mist from an air stream, such as in the exhaust systems of air compressors. The separator allows the exhausted air to be used without the contamination of the oil which has entered the air in the compressor, and provides for the recovery of the oil so that it can be reused. The separator uses a filter media pack through which the air flows and in which the oil coalesces. The separator is mounted in a separation chamber of an oil reservoir tank and is designed to be replaceable, so that the separator can be removed and replaced with a clean separator when the separator becomes dirty or contaminated through use. In most prior art designs of air/oil separators, the shape of the separator is generally radially symmetrical about a central axis, and the separator is mounted so as to be suspended within the separation chamber. The contaminated air usually enters the separation chamber and flows into the center of the air/oil separator where it then flows axially out of the separation chamber. As the air flows radially through the layers of the separator, the oil coalesces and collects on the outside of the separator where it drains into a reservoir. The flow directions may also be reversed in which contaminated air is introduced into the center of the air/oil separator and flows radially outwardly through the layers of the separator with the oil coalescing and collecting on the bottom of the separator, where it can be syphoned off or drained into the reservoir.

An example of a prior art air/oil separator is shown in U.S. Pat. No. 5,605,555, issued to Patel et al. The filter media pack has been typically made of pleated layers of a filter media, formed into a cylinder or other suitable radially symmetrical shape. The filter media pack has been retained in place by end caps mounted onto each. Since the separator was suspended from the top end cap, the top end cap required a rigid metal support in the form of a circular member formed in an inverted trough within which a potting compound was molded with the top end of the filter media pack secured in the compound and held thereby. The separator was mounted in the separation chamber by means of a mounting flange which extended radially outwardly from the top end cap of the separator. The outward end of the flange was captured within two portions of the tank and the inward end was attached to the top end cap, so that the separator was suspended in the separation chamber. Specifically, this mounting flange was typically welded or brazed or otherwise connected to the circular trough member of the top end cap.

While this prior art air/oil separator design operated in a suitable manner, it has always been desirable to make the separators as efficiently as possible and to minimize the steps in the manufacturing operation.

SUMMARY OF THE INVENTION

The present invention provides a unique design for an air/oil separator which minimizes the manufacturing steps in the fabrication of the separator, permits the separator to be made less expensively, provides for more reliable mounting of the separator in the separation chamber, assures a proper seal around the separation chamber, and provides other advantages that have not be realized heretofore.

In accordance with the present invention, the top end cap is integrally made with a radially extending flange to form a single member, and this member is made of a sealing material which permits the separator to be sealingly mounted in the oil tank between the upper rim of the tank body and the bottom of the tank cover. Using the separator of the present invention, it is unnecessary to provide separate sealing members, such as O-rings or a flat gasket between the body and the cover. The separator can be made with integral ribs which replace existing O-rings and which fit into existing O-ring grooves to provide greater sealing reliability. Since the sealing between the tank body and the tank cover is provided by the mounting flange of the separator, the tank cover will not fit sealingly on the body unless the separator is in place. If a user attempts to operate the air compressor without the air/oil separator, the tank will not be sealingly closed, and the compressor will not generate the desired air pressure, making the compressor unusable. The separator design of the present invention thus provides a failsafe method of assuring the presence and proper positioning of the air/oil separator. This also provides a significant advantage in the acceptance testing during the final assembly in the manufacture of compressors, because the invention assures that the absence of an installed air/oil separator will be discovered during the acceptance test and not after the compressor leaves the factory.

These and other advantages are provided by the present invention of an air/oil separator in an oil reservoir tank having a tank body and a tank cover. The air/oil separator comprises a filter media pack, arranged radially symmetrically about an axis, a bottom end cap secured to one end of the filter media pack, and a top end cap and flange member. The top end cap and flange member is made of a moldable material and has a top end cap portion and a flange portion, the other end of the filter media pack being embedded in the top end cap portion. The flange portion extends radially outwardly from the axis for mounting the separator between the tank body and the tank cover. The top end cap and flange member is formed of a sealing material.

BRIEF DESCRIPTION OF THE DRAWINGS

FIG. 3 is detailed side sectional view of a portion of FIG. 2 showing the top cap and flange assembly of the separator.

DETAILED DESCRIPTION OF THE PREFERRED EMBODIMENT

Figure 1:
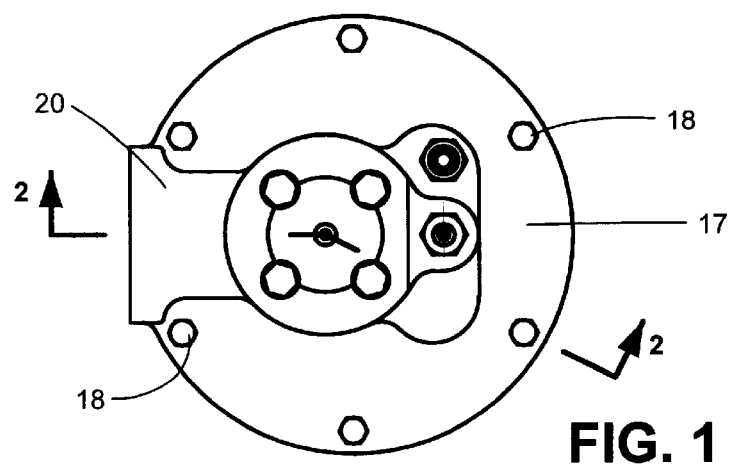
FIG. 1 is a top plan view of a oil reservoir tank for use with the present invention.
Figure 2:
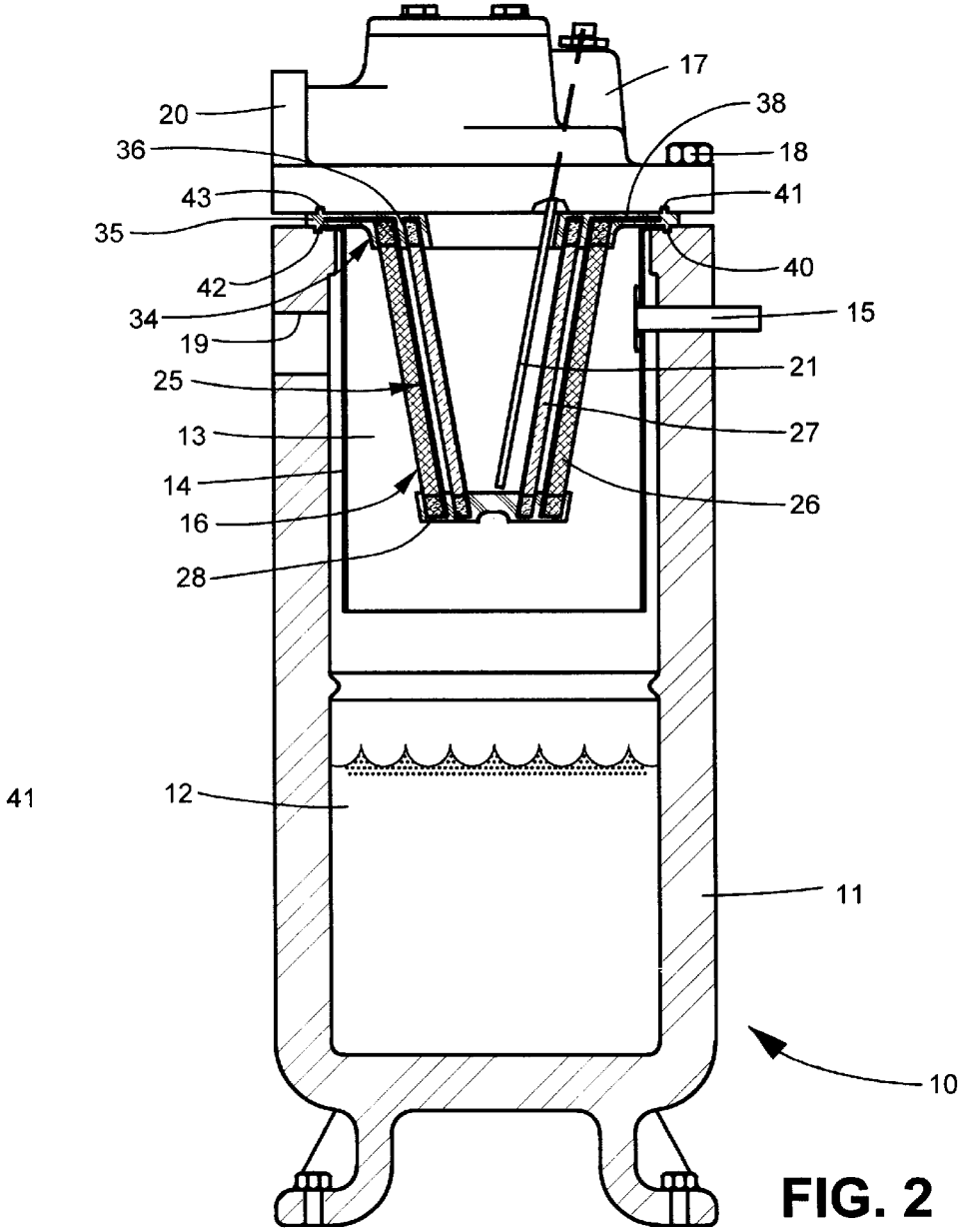
FIG. 2 is side sectional view taken along line 2—2 of FIG. 1 showing the tank with the air/oil separator of the present invention.

Referring more particularly to the drawings and initially to FIGS. 1 and 2, there is shown an oil tank 10 for use in the present invention. The tank shown and described herein is only one of many arrangements in which the present invention may be used, and the tank and separation configuration may be altered significantly without affecting the present invention. The pre-separated tank 10 comprises a body 11 having a reservoir 12 formed at the bottom for collection of separated oil. The upper portion of the body 11 forms a separation chamber 13 within which a shroud 14 is provided. A safety valve 15 extends from within the shroud through the side wall of the tank body 11. An air/oil separator 16 is mounted in the separation chamber 13 within the shroud 14. The tank cover 17 is mounted to the top of the body 11 by bolts 18 or other suitable fastening devices. An air inlet 19 is formed on one side of the body 11 through which air enters the separation chamber 13. The air passes through the separator 16 and leaves the separation chamber 13 through an air outlet 20 formed in the tank cover 17. The oil coalesces on the interior of the separator 16 and drains into the bottom of the separator interior where it is removed through a scavenging tube 21 which extends downwardly from the tank cover 17 into the separator.

The separator 16 comprises a filter media pack 25 having a desirable axially symmetrical shape. Preferably, the media pack 25 is conical or frustoconical in shape, as shown in FIG. 2, but the media pack may also be made in a conventional cylindrical shape if desired, or any other desirable axially symmetrical shape. The media pack 25 may be comprised of any suitable combination of filtering elements, such as fiberglass, polyester, polypropylene or metal, some of which may be pleaded in a conventional manner, or which may be molded, wrapped or otherwise shaped. In the preferred form shown, the media pack comprises two different stage layers, a coalescing stage layer 26 and a drain stage layer 27, with the drain stage layer mounted on the downstream side of the coalescing stage layer. The filter media pack 25 also preferably includes an outer wrap layer on the exterior of the filter media pack, and a support member along the interior surface of the filter media pack. The filter media pack 25 is held in place at each end by end caps. The bottom end cap 28 is generally circular and made of a moldable plastic or elastic material such as polyurethane. The bottom end cap 28 is molded in place around one end of the filter media pack 25, so the end of the media pack is embedded in the bottom end cap and fully supported thereby. The media pack 25 is thus sealed to the bottom end cap 28, and fluid is prevented from flowing into or out of the interior of the separator, except through the media pack. Instead of a molded bottom end cap 28, the bottom end cap can be made in a more conventional manner using a metal retaining member with the bottom end of the filter media pack 25 set in a hardenable sealant material.

At the top of the separator 16 is a unitary top end cap and flange member 34 which by itself comprises a flange portion 35 and an end cap portion 36. The top end of the filter media pack 25 is held in position by being set in the top end cap portion 36 of the member 34, as explained in more detail below.

The top end cap and flange member 34 is shown in more detail in FIG. 2. The member 34 is made of a molded sealing material which is also a preferably an elastomeric material, such as polyurethane. The member 34 comprises the flange portion 35 and the end cap portion 36. The flange portion 35 extends radially outwardly and is used to mount the separator in the separation chamber 13. The end cap portion 36 protects and seals the top end of the filter media pack 25, and the end of the media filter pack is embedded with the molded end cap portion. Similar to the bottom end cap 28, the media pack 25 thus is sealed to the top end cap portion 36, and fluid is prevented fluid from flowing into or out of the interior of the separator, except through the media pack.

An annular metal reinforcing member may be provided in the form of a disc 38 between upper and lower layers of the flange portion 35. The disc 38 is preferably made of perforated or expanded metal, and is used to reinforce the polyurethane material of the flange portion 35 where pressure fluctuations or reversals can occur. Since the disc 38 is preferably of metal, it is electrically conductive, and it may also be used to assure electrical grounding of the air/oil separator. Electrical grounding could include dimples which would be pressed into the disc 38 and which would protrude through the polyurethane flange portion 35 and contact metal portions of the tank. Electrical grounding could also be accomplished by providing an electrical conductive additive in the polyurethane material of the flange portion, rendering the entire top end cap and flange member 34 conductive.

The separator 16 is mounted in the separation chamber 13 by being suspended from the flange portion 35 which extends radially outwardly from the separator at the top of the separator. The outward periphery of the flange portion 35 is captured between the top of the tank body 11 and the bottom of the tank cover 17. A pair of grooves 40 and 41 are preferably provided on the top rim of the tank body 11, and around the periphery of the bottom of the tank cover 17, respectively. These grooves 41 and 40 have been provided for O-rings which have been used to seal the tank body to the cover and to seal the conventional metal mounting flange of the separator therebetween. In accordance with this invention, the flange portion 35 may include a pair of circumferential sealing beads or ribs 42 and 43, each of which fits within one of the grooves 40 and 41. Since the flange portion 35 is made of an elastomeric sealing material, there is no need for separate O-rings as provided in the prior art. The present invention thus provides for a simpler interface between the tank body and cover, and thus makes the separator easier to install.

The elastomeric flange portion 35, fitting between the top rim of the tank body 11 and the outer bottom periphery of the tank cover 17, by itself provides all of the necessary sealing between the tank body and the cover. As can be seen in FIG. 3, the tank cover 17 is separated from the tank body 11 by the thickness of the flange portion 35. In the event that a user would attempt to operate the air compressor without the separator 16, either through inadvertence in replacing a old separator with a new separator when the old separator is removed, or intentionally in an attempt to avoid the cost of a replacement separator, the reservoir would leak excessively through the resulting gap between the tank body 11 and the tank cover 17. Thus the present invention an automatic assurance that a separator 16 is being used and that the separator is properly in place in the tank, since the air compressor would not be operable without it.

While the separator 16 shown in FIG. 2 is shown mounted at the level of the flange portion 35 such that the top end of the media pack 25 is at about the same level as the flange, this is only one possible configuration of the separator of the present invention. It should be understood that the flange portion could also extend axially above the level of the media pack, so that the separator hangs below the level of the flange in order to conform to the configuration of existing separators, or the flange can extend in any other configuration as desired.

In the fabrication of the separator 16 of the present invention, the filter media pack 25 is formed in accordance with conventional techniques. The bottom end cap 28 is formed by positioning the bottom end of the media pack 25 within a mold using a suitable jig, and filling the mold with the elastomeric material. The material is then cured forming the bottom end cap 28 and securing the bottom end of the media pack 25 in position. The top end cap and flange member 34 is then formed using a similar technique. The top end of the filter media pack 25 is positioned in another suitable jig. The mold is then filled with the elastomeric material which is allowed to cure and harden, securing the top end of the filter media pack 25. The fabrication of the separator 16 is thus completed without the necessity of separately attaching the flange to the end cap.

The separator 16 is installed in the tank 10 by removing the bolts 18 to allow the tank cover 17 to be removed from the tank body 11, and placing the separator 16 into the separation chamber 13 with the flange portion 35 extending over the top rim of the tank body, and with the rib 42 fitting within the groove 40. The tank cover 17 is then replaced, the outer periphery of the flange portion 35 being trapped the top rim of the tank body 11 and the outer periphery of the bottom of the tank cover, and with the other rib 43 fitting within the groove 41 in the cover. The tank cover 17 is secured to the body using the bolts 18. The separator is then held in the separation chamber 13, suspended from the flange portion 35. There is no fabricated joint between the flange and the end cap which is subject to fail, so the separator is held more securely. Furthermore, the flange portion 35 provides a sealing engagement between the tank body 11 and the tank cover 17, so that no separate O-rings are necessary.

While the air/oil separator of this invention has been described with reference to an outside-in air flow in the oil tank having an outside-in air flow, it should be understood that the separator provides equal advantages when the air is flowing the opposite direction. Instead of air entering the oil tank 10 through the inlet 19 and exiting through the outlet 20, the air flow may be reversed with the air entering the oil tank through the passage 20 and exiting through the passage 19. The air/oil separator provides the same advantages under these circumstances.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is is inconsistent with the extent to which the progress in the art has been advanced by the invention.

What is claimed is:

1. In an oil reservoir tank having a tank body and a tank cover, an air/oil separator comprising:

a filter media pack, arranged radially symmetrically about an axis, the filter media pack having upper and lower ends spaced along the axis;

a bottom end cap secured to the lower end of the filter media pack; and a top end cap and flange member made of a moldable material and having a top end cap portion and a flange portion, the upper end of the filter media pack being embedded in the top end cap portion when the top end cap and flange member is molded and thereby sealing one end of the filter media pack to the top end cap and flange member, the top end cap and flange member being formed of a sealing material, the flange portion extending radially outwardly from the axis for mounting the separator between the tank body and the tank cover, the flange portion forming a seal between the tank body and the tank cover.

2. An air/oil separator as in claim 1, wherein the filter media pack is generally frustoconical in shape.

3. An air/oil separator as in claim 1, wherein the ends of the filter media pack are secured to the bottom end cap and the top end cap and flange member by being molded in each of the bottom end cap and the top end cap and flange.

4. An air/oil separator as in claim 1, wherein the top end cap and flange member is made of an elastomeric material.

5. In an oil reservoir tank having a tank body and a tank cover, a circumferential groove being formed on the tank body or the tank cover, an air/oil separator comprising:

a filter media pack, arranged radially symetrically about an axis;

a bottom end cap secured to one end of the filter media pack; and a top end cap and flange member made of a moldable material and having a top end cap portion and a flange portion, the other end of the filter media pack being embedded in the top end cap portion, the top end cap and flange member being formed of a sealing material, the flange portion extending radially outwardly from the axis for mounting the separator between the tank body and the tank cover, the flange portion including a circumferential rim for fitting within the groove, the flange portion forming a seal between the tank body and the tank cover.

6. In an oil reservoir tank having a tank body and a tank cover, a circumferential groove being formed on the tank body or the tank cover an air/oil separator, comprising:

a filter media pack, arranged radially symmetrically about an axis;

a bottom end cap secured to one end of the filter media pack; and a top end cap and flange member made of a moldable material and having a top end cap portion and a flange portion, the other end of the filter media pack being embedded in the top end cap portion, the top end cap and flange member being formed of a sealing material, the flange portion extending radially outwardly from the axis for mounting the separator between the tank body and the tank cover, the flange portion including a reinforcing member embedded therein, the flange portion forming a seal between the tank body and the tank cover.

7. An air/oil separator as in claim 6, wherein the reinforcing member is an annular metal disc.

8. An oil reservoir tank for an air compressor system comprising:

a tank body having an open top, a portion of the tank body forming an oil separation chamber;

a tank cover covering the open top of the tank body; and an air/oil separator suspended in the separation chamber, the separator comprising a filter media pack, arranged radially symmetrically about an axis, the filter media pack having upper and lower ends spaced along the axis, a bottom end cap secured to the lower end of the filter media pack, and a top end cap and flange member made of a moldable material and having a top end cap portion and a flange portion, the upper end of the filter media pack being embedded in the top end cap portion when the top end cap and flange member is molded and thereby sealing one end of the filter media pack to the top end cap and flange member, the top end cap and flange member being formed of a sealing material, the flange portion extending radially outwardly from the axis for mounting the separator between the tank body and the tank cover, the flange portion forming a seal between the tank body and the tank cover.

9. An oil reservoir tank as in claim 8, wherein the filter media pack is generally frustoconical in shape.

10. An oil reservoir tank as in claim 8, wherein the ends of the filter media pack are secured to the bottom end cap and the top end cap and flange member by being molded in each of the bottom end cap and the top end cap and flange.

11. An oil reservoir tank as in claim 8, wherein the top end cap and flange member is made of an elastomeric material.

12. An oil reservoir tank for an air compressor system, comprising:

a tank body having an open top, a portion of the tank body forming an oil separation chamber;

a tank cover covering the open top of the tank body, the tank body or the tank cover having a circumferential groove formed therein where the tank cover abuts the tank body; and an air/oil separator suspended in the separation chamber, the separator comprising
a filter media pack, arranged radially symmetrically about an axis,
a bottom end cap secured to one end of the filter media pack, and
a top end cap and flange member made of a moldable material and having a top end cap portion and a flange portion, the other end of the filter media pack being embedded in top end cap portion, the top end cap and flange member being formed of a sealing material, the flange portion extending radially outwardly from the axis for mounting the separator between the tank body and the tank cover, the flange portion including a circumferential rim for fitting within the groove, the flange portion forming a seal between the tank body and the tank cover.

13. An air/oil separator for an air compressor system, comprising:

a tank body having an open top, a portion of the tank body forming an oil separation chamber;

a tank cover covering the open top of the tank body, the tank body or the tank cover having a circumferential groove formed therein where the tank cover abuts the tank body; and an air/oil separator suspended in the separation chamber, the separator comprising
a filter media pack, arranged radially symmetrically about an axis,
a bottom end cap secured to one end of the filter media pack, and
a top end cap and flange member made of a moldable material and having a top end cap portion and a flange portion, the other end of the filter media pack being embedded in top end cap portion, the top end cap and flange member being formed of a sealing material, the flange portion extending radially outwardly from the axis for mounting the separator between the tank body and the tank cover, the flange portion including a reinforcing member embedded therein, the flange portion forming a seal between the tank body and the tank cover.

14. An air/oil separator as in claim 13, wherein the reinforcing member is an annual metal disc.

* * * * *

UNITED STATES PATENT AND TRADEMARK OFFICE
CERTIFICATE OF CORRECTION

PATENT NO.     : 6,136,076
DATED          : October 24, 2000
INVENTOR(S)    : Read It is certified that error appears in the above-identified patent and that said Letters Patent is hereby corrected as shown below:

<u>Column 6,</u>
Line 25, after "separator", a comma -- , -- should be inserted.

Signed and Sealed this

Twenty-first Day of September, 2004

JON W. DUDAS
*Director of the United States Patent and Trademark Office*